United States Patent
Avery (10) Patent No.: US 8,433,720 B2
(45) Date of Patent: Apr. 30, 2013

(54) ENABLING AN APPLICATION TO INTERACT WITH AN LDAP DIRECTORY AS THOUGH THE LDAP DIRECTORY WERE A DATABASE OBJECT

(75) Inventor: Dirk J. Avery, Ellicott City, MD (US)

(73) Assignee: Oracle International Corporation, Redwood Shores, CA (US)

( * ) Notice: Subject to any disclaimer, the term of this patent is extended or adjusted under 35 U.S.C. 154(b) by 1495 days.

(21) Appl. No.: 11/027,441

(22) Filed: Dec. 29, 2004

(65) Prior Publication Data

US 2006/0143210 A1    Jun. 29, 2006

(51) Int. Cl.
*G06F 7/00* (2006.01)

(52) U.S. Cl.
USPC .......................................................... 707/769

(58) Field of Classification Search .................. 707/101, 707/102
See application file for complete search history.

(56) References Cited

U.S. PATENT DOCUMENTS

| | | | | |
|---|---|---|---|---|
| 5,717,924 A * | 2/1998 | Kawai | ............................ | 707/102 |
| 5,946,700 A * | 8/1999 | Pongracz et al. | ............. | 707/203 |
| 6,016,499 A * | 1/2000 | Ferguson | .................... | 707/104.1 |
| 6,029,160 A * | 2/2000 | Cabrera et al. | .................... | 707/1 |
| 6,052,681 A * | 4/2000 | Harvey | ............................. | 707/3 |
| 6,085,188 A * | 7/2000 | Bachmann et al. | ................ | 707/3 |
| 6,115,703 A * | 9/2000 | Bireley et al. | ...................... | 707/2 |
| 6,236,988 B1 * | 5/2001 | Aldred | .............................. | 707/3 |
| 6,424,358 B1 * | 7/2002 | DiDomizio et al. | ........... | 715/762 |
| 6,453,325 B1 * | 9/2002 | Cabrera et al. | ................. | 707/204 |
| 6,523,028 B1 * | 2/2003 | DiDomizio et al. | .............. | 707/5 |
| 6,587,856 B1 * | 7/2003 | Srinivasan et al. | ............. | 707/102 |
| 6,748,374 B1 * | 6/2004 | Madan et al. | ...................... | 707/3 |
| 6,834,286 B2 * | 12/2004 | Srinivasan et al. | ......... | 707/103 R |
| 6,985,905 B2 * | 1/2006 | Prompt et al. | ................. | 707/102 |
| 7,028,043 B2 * | 4/2006 | Bleizeffer et al. | ............. | 707/102 |
| 7,080,062 B1 * | 7/2006 | Leung et al. | ....................... | 707/2 |
| 7,152,073 B2 * | 12/2006 | Gudbjartsson et al. | ........ | 707/102 |
| 2001/0037339 A1 * | 11/2001 | Harvey | ........................... | 707/102 |
| 2002/0103785 A1 * | 8/2002 | Harvey | ............................ | 707/3 |
| 2002/0107828 A1 * | 8/2002 | Harvey | ............................ | 707/1 |
| 2002/0116370 A1 * | 8/2002 | Harvey | ............................ | 707/3 |
| 2002/0169767 A1 * | 11/2002 | Harvey | ............................ | 707/4 |
| 2003/0105749 A1 * | 6/2003 | Harvey | ............................ | 707/3 |
| 2003/0191759 A1 * | 10/2003 | Harvey | ............................ | 707/4 |
| 2003/0208478 A1 * | 11/2003 | Harvey | ............................ | 707/3 |

(Continued)

OTHER PUBLICATIONS

McCullough-Dieter, Carol. Oracle8i for Dummies. Foster City: IDG Books Worldwide, 2001. pp. 225-227 & 400.*

*Primary Examiner* — Joshua Bullock
(74) *Attorney, Agent, or Firm* — Hickman Palermo Truong Becker Bingham Wong LLP (57) ABSTRACT

A method and apparatus for enabling a database-accessing application to access current LDAP directory data is provided. According to one aspect, a database command that creates a database view is executed. The database view presents the results of a query on a table function that returns data from an LDAP directory. Because the results presented by the view contents are determined at the time that the view is queried, the view is always consistent with the directory. The database command may assign, to the view, a label that is assigned to a database table that an application is designed to access, so that whenever the application would attempt to access an object that corresponds to the label, the application accesses the view instead of the table. Consequently, it is not necessary to load the directory data into the table.

22 Claims, 3 Drawing Sheets

U.S. PATENT DOCUMENTS

| | | | |
|---|---|---|---|
| 2003/0213316 A1* | 11/2003 | Harvey | 73/866.4 |
| 2004/0103109 A1* | 5/2004 | Huras et al. | 707/100 |
| 2005/0165807 A1* | 7/2005 | Srinivasan et al. | 707/100 |
| 2005/0198074 A1* | 9/2005 | Khayter et al. | 707/104.1 |
| 2006/0020613 A1* | 1/2006 | Harvey | 707/100 |
| 2006/0041570 A1* | 2/2006 | Lowe et al. | 707/101 |

* cited by examiner

ENABLING AN APPLICATION TO INTERACT WITH AN LDAP DIRECTORY AS THOUGH THE LDAP DIRECTORY WERE A DATABASE OBJECT

FIELD OF THE INVENTION

The present invention relates to databases, and in particular, to enabling an application to interact with an LDAP directory as though the LDAP directory were a database object.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is relatively standard in many industries to store information in on-line directories that conform to the X.500 standard. The lightweight directory access protocol (LDAP) provides relatively simple mechanisms for accessing and updating data that is contained in such directories. Because LDAP was designed to be used in conjunction with Transmission Control Protocol/Internet Protocol (TCP/IP), LDAP is especially useful for accessing and updating directory data via the Internet.

Although LDAP can be used to access and update data stored in LDAP directories, LDAP does not provide much of the rich functionality that database query languages, such as Structured Query Language (SQL) provide. SQL is firmly established and widely recognized. It is not surprising, then, that many applications have been designed to send SQL queries to a database server in order to retrieve data from database tables.

Under some circumstances, the data that an application needs to access is stored in an LDAP directory rather than a database table. According to past approaches, if an application is designed to access a database table using SQL instead of an LDAP directory using LDAP, then some intermediary mechanism is needed in order to get the LDAP directory data into a database table. Such a mechanism exists, but its use is accompanied by some significant drawbacks.

Typically, such a mechanism "synchronizes" a database table with an LDAP directory by periodically loading the LDAP directory data into the database table. However, in the interval occurring between synchronization operations, the LDAP directory data is susceptible to alteration. If the database table is queried after the LDAP directory data has been altered but before the next synchronization operation, then the query may return outdated and incorrect data. Decreasing the amount of time that passes between synchronization operations reduces, but does not nullify, the likelihood of this problem occurring. Indeed, scheduling more frequent synchronization operations can actually compound other problems.

One of these other problems results from the fact that because each synchronization operation consumes processing and communication resources, increasing the frequency of the synchronization operations causes more processing and communication resources to be consumed. As the LDAP directory data grows in size, the synchronization operations consume a greater portion of the resources.

LDAP directories are often located remotely from the applications that access those LDAP directories, and are often accessed via networks. For the duration of each synchronization operation, some of the network's limited bandwidth becomes unavailable for other purposes. In many networks, this kind of bandwidth monopolization is unacceptable.

Because they are performed at regular intervals without regard to whether LDAP directory data has been altered since the last synchronization operation, some synchronization operations might not accomplish anything beyond wasting processing and communication resources. The synchronization mechanisms used under past approaches are not sophisticated enough to determine when LDAP directory data has been altered, so those synchronization mechanisms continue to employ periodic synchronization schemes.

Although only a small portion of the LDAP directory data might have changed since the last synchronization operation, synchronization mechanisms used under past approaches are not sophisticated enough to detect which portions of the LDAP directory data have changed. Consequently, under past approaches, all of the LDAP directory data is loaded into a database during every synchronization operation. This exacerbates the resource consumption problem.

A less error-prone and less resource-consuming way of allowing a database-accessing application to access LDAP directory data is needed. Furthermore, since interfacing directly with an LDAP directory can be complex and cumbersome, a simpler and easier way of accessing LDAP directory data is needed.

SUMMARY

Techniques are described for accessing an LDAP directory using database access mechanisms. Employing such techniques, application developers can develop applications that access LDAP directory data even if those developers know little or nothing about LDAP as a protocol. Techniques are also described for enabling an existing application to interact with an LDAP directory as though the LDAP directory were a database object. According to one such technique, a database command is executed to create a database view. The database view presents data that is always consistent with data in an LDAP directory as of the moment that the database view is queried. The database command that creates the database view assigns, to the database view, the same label (i.e., name) that is assigned to a database table that the application is designed to access, so that whenever the application attempts to access a database object that corresponds to the label, the application accesses the database view instead of the database table. Because the application accesses the database view instead of the database table, it is not necessary to load the LDAP directory data into the database table.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described for accessing an LDAP directory using database access mechanisms. Employing such techniques, application developers can develop applications that access LDAP directory data even if those developers know little or nothing about LDAP as a protocol. Techniques are also described for enabling an existing application to interact with an LDAP directory as though the LDAP directory were a database object. According to one such technique, a database command is executed to create a database view. The database view presents data that is always consistent with data in an LDAP directory as of the moment that the database view is queried. The database command that creates the database view assigns, to the database view, the same label (i.e., name) that is assigned to a database table that the application is designed to access, so that whenever the application attempts to access a database object that corresponds to the label, the application accesses the database view instead of the database table. Because the application accesses the database view instead of the database table, it is not necessary to load the LDAP directory data into the database table.

Data accessed from the database view is always consistent with the LDAP directory data because of the dynamic nature of database views. Essentially, the database view's contents are not determined until the time that the database view is accessed. The database view presents the results of an SQL query on a "table function" rather than an actual database table. A table function is a function that returns a result set, and which can be called in the FROM clause of a query as if the function's result set were a table. For example, the table function may be implemented in PL/SQL.

In the following SQL statement, for example, the table function "Y" is specified by the "TABLE" directive by virtue of being enclosed within the parenthesis immediately following the "TABLE" keyword:

CREATE VIEW X(A, B, C) AS SELECT A, B, C FROM TABLE(Y);

Upon the evaluation of the TABLE directive, the specified table function is executed. The table function returns data that is contained in an LDAP directory. The "TABLE" directive causes each entry of this data to be represented as a separate row of a virtual database table, so that a database server can query the data. An example table function that returns LDAP directory data is described below.

Database Architecture

Figure 1:
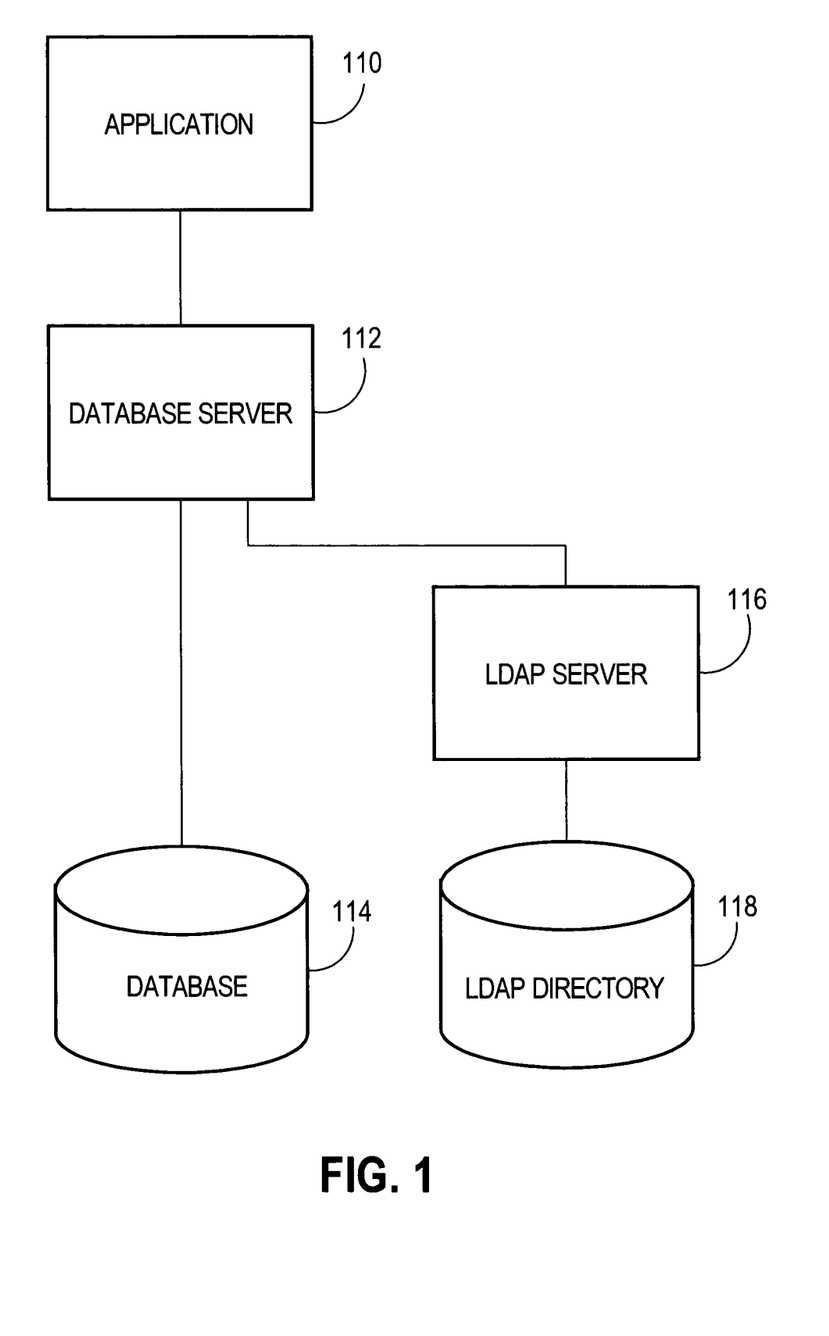
FIG. 1 is a block diagram showing a database architecture that may be used to implement an embodiment of the present invention.

FIG. 1 is a block diagram showing a database architecture that may be used to implement an embodiment of the present invention. The architecture comprises an application 110, a database server 112, a database 114, an LDAP server 116, and an LDAP directory 118. Database server 112 interacts with a user via application 110, and accesses and maintains database 114 in accordance with database commands that application 110 issues.

Database server 112 also interacts with LDAP server 116 by executing table functions. The table functions invoke LDAP mechanisms to cause LDAP server 116 to retrieve specified data from LDAP directory 118 and return the specified data to database server 112. LDAP server 116 may be an Oracle Internet Directory server, for example. Database server 112 may also interact with other systems (not shown).

In general, database server 112 creates a database by organizing information in one or more tables. The organization of the table is referred to as a definition. An index is a structure that is used for accessing particular information in the table more quickly. Therefore, a table definition supports any access mechanism to the data (search by name, by ID, by date, etc.), whereas an index is designed for a specific access method. The index itself is generally not the authoritative source of the data, but rather contains pointers to the disk addresses of the tables storing the authoritative data.

LDAP directory 118 stores data in a hierarchical form. The manner in which such data is organized is briefly discussed in *Oracle Internet Directory Application Developer's Guide*, Release 9.2, which is incorporated by reference in its entirety for all purposes as though fully disclosed herein. For example, LDAP directory 118 might store data entries for a company's employees—one entry per employee.

According to one embodiment, application 110 is designed to issue database commands to database server 112, but application 110 is not designed to invoke LDAP mechanisms to interact directly with LDAP server 116. For example, application 110 may be designed to issue SQL queries to retrieve employee data from a database table that has a specific label. As described in the foregoing background, past approaches implemented synchronization mechanisms to periodically synchronize entries in LDAP directory 118 with tables in database 114. However, employing a technique described herein makes such periodic synchronization unnecessary.

Example Technique For Enabling a Database-accessing Application to Access LDAP Directory Data A technique described herein involves the creation of an object type, the creation of a table type to contain a collection of instances of the object type, the creation of a table function that returns LDAP repository data packaged as instances of the object type, and the creation of a database view that invokes the table function. Although a version of the techniques described below contemplate the involvement of an application that is designed to access a database table, the techniques described herein are also applicable to applications that are designed to access a database view such as is described below instead. Furthermore, techniques below may be used to design new (not previously existing) applications that access LDAP repository data through database views. This makes application development easier for those who are familiar with databases but are less familiar with LDAP as a protocol.

Figure 2:
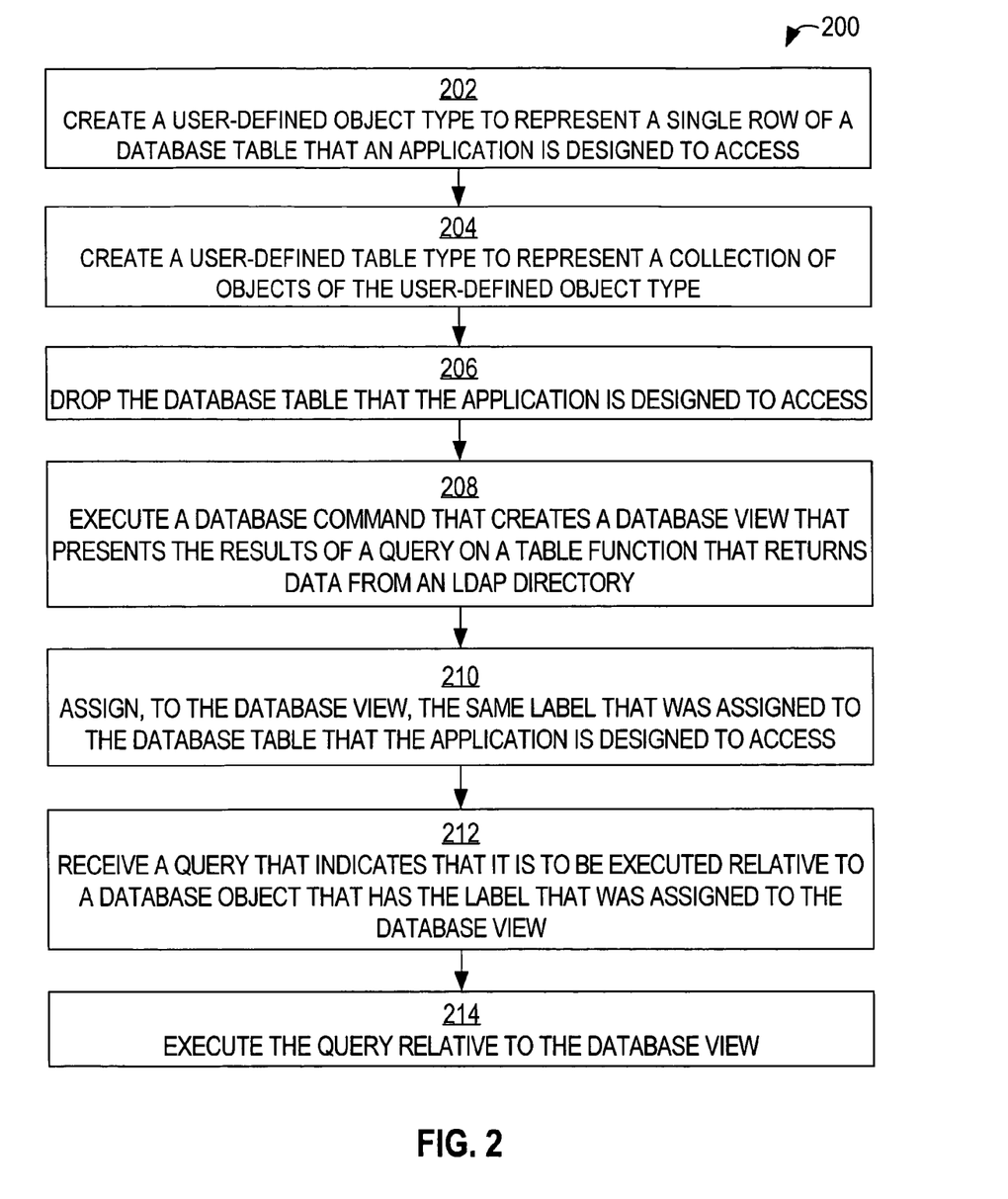
FIG. 2 shows a flow diagram that illustrates a technique, according to an embodiment of the invention, for enabling a database-accessing application to access LDAP directory data.

FIG. 2 shows a flow diagram that illustrates a technique 200, according to an embodiment of the invention, for enabling a database-accessing application to access LDAP directory data. Database server 112 may perform technique 200, for example.

In block 202, a user-defined object type is created to represent a single row of a database table. In one embodiment, the database table may be a table that an application is already designed to access. The user-defined object type has attributes of the same type as the columns of the database table. User-defined object types are described in *Oracle 9i SQL Refer-*

*ence*, Release 2, which is incorporated by reference in its entirety for all purposes as though fully set forth herein. For example, assuming that application 110 is designed to access a table labeled "user" in database 114, database server 112 may create a new user-defined object type to represent a row of the "user" table. The following example database command may be issued to database server 112 in order to cause database server 112 to create the new user-defined object type:

```
CREATE TYPE "USER_T" AS OBJECT (
    "USER_ID" NUMBER(10,0),
    "USERNAME" VARCHAR2(31),
    "FIRSTNAME" VARCHAR2(255),
    "MIDDLENAME" VARCHAR2(255),
    "LASTNAME" VARCHAR2(255),
    "TELEPHONE" VARCHAR2(255),
    "FAX" VARCHAR2(255),
    "TITLE" VARCHAR2(255),
    "EMAIL" VARCHAR2(255),
    "MANAGER_ID" NUMBER(10,0));
```

In block 204, a user-defined table type is created to represent a collection of objects (i.e., instances) of the user-defined object type. For example, database server 112 may create a new user-defined table type to represent a collection of the "user" objects described above. The following example database command may be issued to database server 112 in order to cause database server 112 to create the new user-defined table type:

CREATE TYPE "USERSET_T" AS TABLE OF "USER_T";

In an embodiment in which the application is already designed to access a specific database table, in block 206, the database table is optionally dropped. For example, database server 112 may drop the "user" database table from database 114 so that the "user" database table no longer exists within database 114. Although the database table is dropped in one embodiment, according to an alternative embodiment, the application is designed to access a database view instead of the database table; thus, in one embodiment, the database table does not exist in the first place.

In block 208, a database command that creates a database view is executed. When accessed by a query, the database view presents, to the accessing query, the results of a query on a table function that returns data from an LDAP directory. In the aforementioned embodiment in which the application is already designed to access a specific database table, in block 210, the database command assigns, to the database view, the same label that was assigned to the database table that the application is designed to access (e.g., "user"). Thus, the database view essentially replaces the database table. For example, database server 112 may create a database view that presents the results of such a table function as a virtual database table. The following example database command may be issued to database server 112 in order to cause database server 112 to create the database view:

```
CREATE OR REPLACE VIEW "USER" (
    "USER_ID",
    "USERNAME",
    "FIRSTNAME",
    "MIDDLENAME",
    "LASTNAME",
    "TELEPHONE",
    "FAX",
    "TITLE",
    "EMAIL",
    "MANAGER_ID")
AS
SELECT
    USER_ID,
    USERNAME,
    FIRSTNAME,
    MIDDLENAME,
    LASTNAME,
    TELEPHONE,
    FAX,
    TITLE,
    EMAIL,
    MANAGER_ID
FROM TABLE(LDAP_FUNCTIONS.GetUsers);
```

In the above example, the table function "LDAP_FUNCTIONS.GetUsers" retrieves corresponding specified data from LDAP directory 118. The table function may be implemented as a PL/SQL package. An example PL/SQL package "LDAP_FUNCTIONS" that implements the "LDAP_FUNCTIONS.GetUsers" table function is shown below:

```
CREATE OR REPLACE PACKAGE BODY "LDAP_FUNCTIONS" AS
  function GetUsers
  return userset_t pipelined is
  row_var user_t;
  my_session DBMS_LDAP.session;
  my_attrs DBMS_LDAP.string_collection;
  retval pls_integer default -1;
  results DBMS_LDAP.message;
  my_entry DBMS_LDAP.message;
  my_attr_name varchar2(256);
  my_ber_elmt DBMS_LDAP.ber_element;
  my_vals DBMS_LDAP.string_collection;
  dn_parts DBMS_LDAP.string_collection;
  begin
  my_session := DBMS_LDAP.init('DNIAVERY', 389);
  retval := DBMS_LDAP.simple_bind_s(my_session,
  'cn=orcladmin', 'welcome');
  my_attrs(1) := 'cn';
  my_attrs(2) := 'uid';
  my_attrs(3) := 'givenname';
  my_attrs(4) := 'initials';
  my_attrs(5) := 'sn';
  my_attrs(6) := 'telephoneNumber';
  my_attrs(7) := 'facsimileTelephoneNumber';
  my_attrs(8) := 'title';
  my_attrs(9) := 'mail';
  my_attrs(10) := 'manager';
  retval := DBMS_LDAP.search_s(
  my_session,
  'cn=Users, dc=dja, dc=com',
  DBMS_LDAP.scope_onelevel,
  'uid=*',
  my_attrs,
  0,
  results);
  my_entry := DBMS_LDAP.first_entry(my_session, results);
  while my_entry is not null loop
    row_var := user_t(null,null,null,null,null,null,null,null,null,null);
    my_attr_name := DBMS_LDAP.first_attribute(my_session,
    my_entry,
  my_ber_elmt);
    while my_attr_name is not null loop
    my_vals := DBMS_LDAP.get_values (my_session, my_entry,
    my_attr_name);
    if my_vals.COUNT > 0 then
    case my_attr_name
    when 'cn' then row_var.user_id := my_vals(myvals.first);
    when 'uid' then row_var.username := my_vals(my_vals.first);
    when 'givenname' then row_var.firstname := my_vals(my_vals.first);
    when 'initials' then row_var.middlename := my_vals(my_vals.first);
```

-continued

```
    when 'sn' then row_var.lastname := my_vals(my_vals.first);
    when 'telephoneNumber' then row_var.telephone :=
my_vals(my_vals.first);
    when 'facsimileTelephoneNumber' then row_var.fax :=
my_vals(my_vals.first);
    when 'title' then row_var.title := my_vals(my_vals.first);
    when 'mail' then row_var.email := my_vals(my_vals.first);
    when 'manager' then
    begin
        dn_parts := DBMS_LDAP.explode_dn(my_vals(my_vals.first),1);
        -- no
types
        row_var.manager_id := to_number(dn_parts(0), '999999999999');
            end;
        end case;
        end if;
        my_attr_name :=
DBMS_LDAP.next_attribute(my_session,my_entry,my_ber_elmt);
    end loop;
    pipe row(row_var);
    my_entry := DBMS_LDAP.next_entry(my_session, my_entry);
    end loop;
    retval := DBMS_LDAP.unbind_s(my_session);
    return;
end;
end;
```

The PL/SQL package above refers to and makes use of the PL/SQL package "DBMS_LDAP" provided by Oracle International, Inc. "DBMS_LDAP" comprises functional mechanisms for interacting with an LDAP directory. "DBMS_LDAP" is described in greater detail in *Oracle Internet Directory Application Developer's Guide*, Release 9.2.

The PL/SQL package above makes use of "piping." Piping means outputting partial results as those results are determined, and possibly even before complete results have been determined. Piping the results of the "LDAP_FUNCTIONS.GetUsers" table function makes the separate data entries produced by the table function available to the database view as they are retrieved from the LDAP directory, on a data entry-by-data entry basis; there is no need to wait for all of the data entries to be retrieved from the LDAP directory before at least partial results of the table function are made available. Piping is optional.

As is evident from the first line of the "LDAP_FUNCTIONS.GetUsers" table function, the line that reads "return userset_pipelined is row_var user_t", execution of the table function causes specified data entries in LDAP directory 118 to be packaged as instances of the new user-defined object type that was created in block 202; the return type of the table function is the user-defined table type that was created in block 204. The database view created in block 208 presents the collection of these instances as a virtual database table that can be queried by database server 112.

In block 212, a query is received. The query indicates that it is to be executed relative to a database object that has the label that was assigned to the database view. For example, database server 112 may receive, from application 110, an SQL statement that specifies a select operation on the database object having the "user" label. In the aforementioned embodiment in which application 110 was already designed to access a database table, application 110 does not need to be altered to refer to any database object to which application 110 did not already refer.

In block 214, the query is executed relative to the database view. For example, database server may execute the SQL statement to retrieve selected data from the database view and return the selected data to application 110. It is at this time that the data represented by the database view is determined. It is at this time that the table function actually retrieves data entries from the LDAP directory.

Using the technique described above, new applications can be designed to access LDAP repository data through a database view. Application developers can create other database objects that obtain data from such a database view. Additionally, through the technique described above, an application originally designed to access data by querying a database table can be enabled to access data that is currently contained in an LDAP directory. The database view reflects the current contents of the LDAP directory. Inasmuch as the LDAP directory data is not actually loaded into a database table, the LDAP directory remains the only repository that stores the LDAP directory data in a permanent form, so the waste incurred by maintaining multiple repositories is avoided by the above technique.

Although the database view may represent the complete contents of the LDAP directory, the query that defines the data represented by the database view may be qualified with criteria so that the database view represents only a specified subset (e.g., certain attributes) of the LDAP directory's contents that satisfy the criteria.

Materialized Views

In an alternative embodiment, it might not be desirable for the LDAP directory to be accessed whenever the database view is queried. The data presented by a conventional view is gathered and derived "on the fly" from sources (e.g., base tables) in response to queries that access the view. That data gathered for the view is not persistently stored after the query accessing the view has been processed. Because the data provided by conventional views is gathered from the sources at the time the views are accessed, the data from the views will reflect the current state of the sources. However, the overhead associated with gathering the data from the sources for a view every time the view is accessed may be prohibitive.

A materialized view, on the other hand, is a view for which a copy of the view data is stored separate from the sources from which the data was originally gathered and derived. The data contained in a materialized view is referred to herein as "materialized data." Materialized views eliminate the overhead associated with gathering and deriving the view data every time a query accesses the view.

However, to provide the proper data, materialized views must be maintained to reflect the current state of the base tables. When the sources of a materialized view are modified, computer resources must be expended to both determine whether the modifications require corresponding changes to the materialized data, and to make the required corresponding changes. Despite the high cost associated with maintaining materialized views, using a materialized view can lead to a significant overall cost savings relative to a conventional view when the materialized view represents a set of data that is infrequently changed but frequently accessed.

The following example database command may be issued to database server 112 in order to cause database server 112 to create a materialized view that represents data retrieved from an LDAP directory by a table function:

```
CREATE MATERIALIZED VIEW "USER"
    REFRESH START WITH (SYSDATE + 1/288)
    NEXT (SYSDATE + 1/288) AS
SELECT
```

-continued

```
    USER_ID
    USERNAME,
    FIRSTNAME,
    MIDDLENAME,
    LASTNAME,
    TELEPHONE,
    FAX,
    TITLE,
    EMAIL,
    MANAGER_ID
FROM TABLE(LDAP_FUNCTIONS.GetUsers);
```

Hardware Overview

Figure 3:
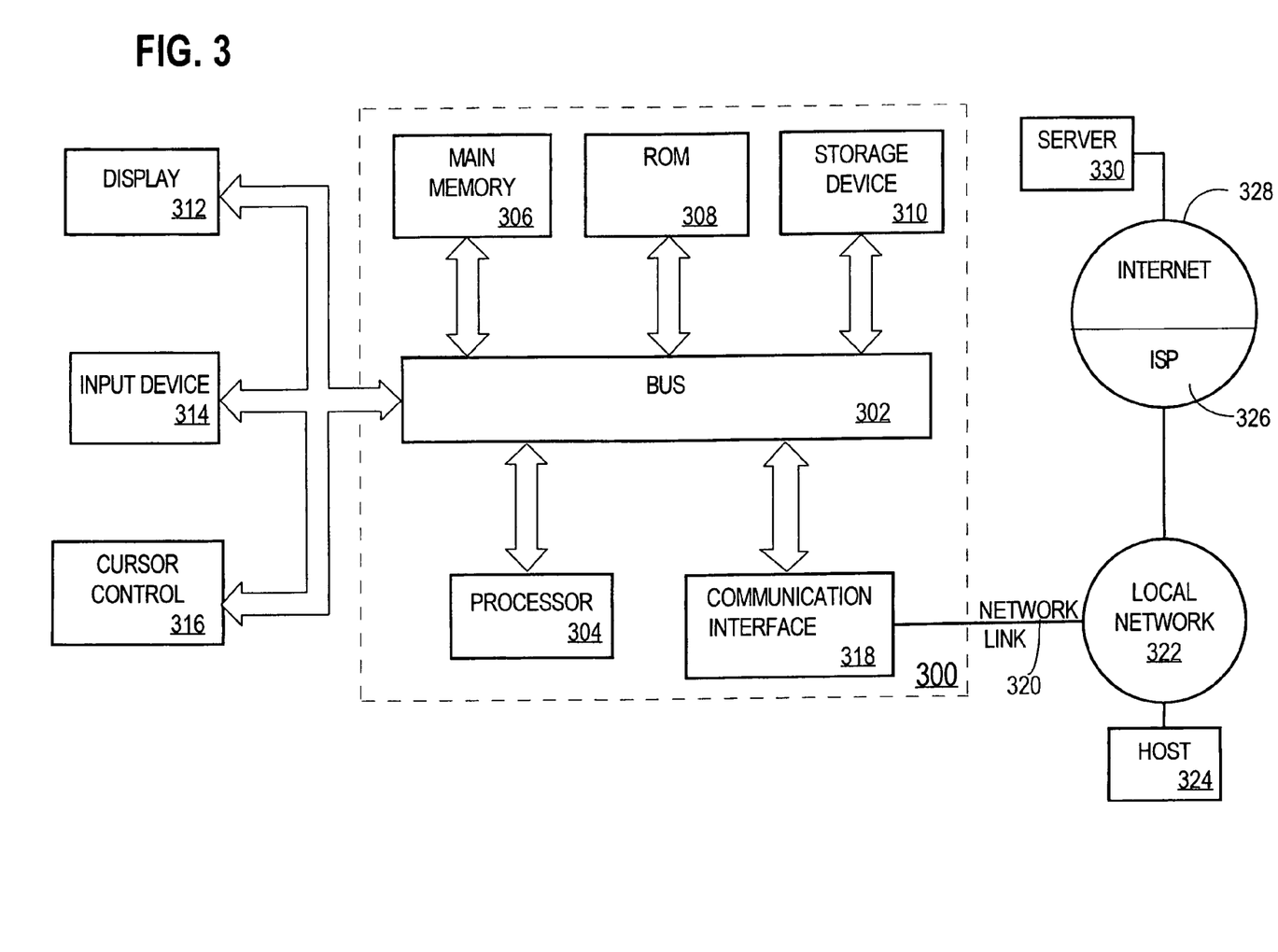
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of accessing information, the method comprising:
   creating, on a database server, a database view that corresponds to data from an LDAP directory;
   assigning a label to the database view;
   allowing an application to interact with the LDAP directory through the database view as though the LDAP directory were a database table;
   wherein said database view:
      is based upon a first Structured Query Language (SQL) query that accesses data from said LDAP directory, and
      is created using a CREATE VIEW statement;
   wherein the step of allowing an application to interact with the LDAP directory through the database view as if the LDAP directory were a database table comprises:
      receiving, from said application, a second SQL query designed to access a database table of a particular name wherein said particular name is identical to the label assigned to the database view, and
      executing said second query relative to the database view; and
   wherein the method is performed by one or more computing devices.

2. The method of claim 1, wherein creating the database view comprises executing a database command that creates the database view and that assigns the label to the database view.

3. The method of claim 1, wherein the database view presents the results of a query on a table function that returns data from the LDAP directory.

4. The method of claim 1, further comprising:
   creating a user-defined object type that is designed to represent a single row of the database table.

5. The method of claim 4, further comprising:
   creating a user-defined table type that is designed to represent a collection of instances of the user-defined object type.

6. The method of claim 4, further comprising:
   executing a database command that packages one or more data entries from the LDAP directory as one or more instances of the user-defined type.

7. The method of claim 1, wherein creating the database view comprises executing a database command that contains phrases "CREATE", "VIEW", "AS SELECT", and "FROM TABLE".

8. The method of claim 1, wherein creating the database view comprises executing a database command that indicates a name of a PL/SQL function that reads data from the LDAP directory.

9. The method of claim 1, further comprising:
   receiving, from the application, a particular query that indicates the label; and
   executing the particular query relative to the database view to select at least a portion of data that is represented by the database view.

10. The method of claim 1, wherein the database view is a materialized view.

11. The method of claim 1, wherein the database view presents the results of a query on a table function that returns data from the LDAP directory in a pipelined manner.

12. A non-transitory computer-readable medium storing one or more sequences of instructions which, when executed by one or more processors, causes the one or more processors to perform steps comprising:
   creating, on a database server, a database view that corresponds to data from an LDAP directory;
   assigning a label to the database view;
   allowing an application to interact with the LDAP directory through the database view as though the LDAP directory were a database table;
   wherein said database view:
      is based upon a first Structured Query Language (SQL) query that accesses data from said LDAP directory, and
      is created using a CREATE VIEW statement; and
   wherein the step of allowing an application to interact with the LDAP directory through the database view as if the LDAP directory were a database table comprises:
      receiving, from said application, a second SQL query designed to access a database table of a particular name wherein said particular name is identical to the label assigned to the database view, and
      executing said second query relative to the database view.

13. The non-transitory computer-readable medium of claim 12, wherein creating the database view comprises executing a database command that creates the database view and that assigns the label to the database view.

14. The non-transitory computer-readable medium of claim 12, wherein the database view presents the results of a query on a table function that returns data from the LDAP directory.

15. The non-transitory computer-readable medium of claim 12, the steps further comprising:
   creating a user-defined object type that is designed to represent a single row of the database table.

16. The non-transitory computer-readable medium of claim 15, the steps further comprising:
   creating a user-defined table type that is designed to represent a collection of instances of the user-defined object type.

17. The non-transitory computer-readable medium of claim 15, the steps further comprising:
   executing a database command that packages one or more data entries from the LDAP directory as one or more instances of the user-defined type.

18. The non-transitory computer-readable medium of claim 12, wherein creating the database view comprises executing a database command that contains phrases "CREATE", "VIEW", "AS SELECT", and "FROM TABLE".

19. The non-transitory computer-readable medium of claim 12, wherein creating the database view comprises executing a database command that indicates a name of a PL/SQL function that reads data from the LDAP directory.

20. The non-transitory computer-readable medium of claim 12, the steps further comprising:
   receiving, from the application a particular query that indicates the label; and
   executing the particular query relative to the database view to select at least a portion of data that is represented by the database view.

21. The non-transitory computer-readable medium of claim 12, wherein the database view is a materialized view.

22. The non-transitory computer-readable medium of claim 12, wherein the database view presents the results of a query on a table function that returns data from the LDAP directory in a pipelined manner.

* * * * *

UNITED STATES PATENT AND TRADEMARK OFFICE
CERTIFICATE OF CORRECTION

| | | |
|---|---|---|
| PATENT NO. | : 8,433,720 B2 | Page 1 of 1 |
| APPLICATION NO. | : 11/027441 | |
| DATED | : April 30, 2013 | |
| INVENTOR(S) | : Avery | |

It is certified that error appears in the above-identified patent and that said Letters Patent is hereby corrected as shown below:

In the Specification:

In column 9, line 54, delete "main 306" and insert -- main memory 306 --, therefor.

In column 10, line 29, delete "main 306" and insert -- main memory 306 --, therefor.

Signed and Sealed this
Twenty-fourth Day of September, 2013

Teresa Stanek Rea
*Deputy Director of the United States Patent and Trademark Office*